United States Patent
Kaschner et al.

(10) Patent No.: US 9,310,180 B2
(45) Date of Patent: Apr. 12, 2016

(54) DEVICE AND METHOD FOR DETECTING THE NUMBER OF REVOLUTIONS OF A ROTATABLE SHAFT

(71) Applicants: Axel Kaschner, Pittsburgh, PA (US); Holger Behrens, Stuttgart (DE)

(72) Inventors: Axel Kaschner, Pittsburgh, PA (US); Holger Behrens, Stuttgart (DE)

(73) Assignee: ROBERT BOSCH GMBH, Stuttgart (DE)

(*) Notice: Subject to any disclaimer, the term of this patent is extended or adjusted under 35 U.S.C. 154(b) by 65 days.

(21) Appl. No.: 14/358,524

(22) PCT Filed: Nov. 9, 2012

(86) PCT No.: PCT/EP2012/072268
§ 371 (c)(1),
(2) Date: May 15, 2014

(87) PCT Pub. No.: WO2013/072254
PCT Pub. Date: May 23, 2013

(65) Prior Publication Data
US 2014/0375307 A1 Dec. 25, 2014

(30) Foreign Application Priority Data
Nov. 15, 2011 (DE) .......... 10 2011 086 406

(51) Int. Cl.
G01P 3/483 (2006.01)
G01P 3/487 (2006.01)
G01B 7/30 (2006.01)
G01D 5/14 (2006.01)
G01D 5/16 (2006.01)
G01D 5/24 (2006.01)

(52) U.S. Cl.
CPC ........ *G01B 7/30* (2013.01); *G01D 5/145* (2013.01); *G01D 5/16* (2013.01); *G01D 5/24* (2013.01); *G01P 3/487* (2013.01)

(58) Field of Classification Search
CPC ................. G01D 5/145; G01P 3/487
USPC ............................. 324/207.25, 166
See application file for complete search history.

(56) References Cited

U.S. PATENT DOCUMENTS

| | | | |
|---|---|---|---|
| 6,384,510 B1 * | 5/2002 | Grade et al. | 310/309 |
| 6,593,731 B1 | 7/2003 | Roukes et al. | |
| 2005/0068133 A1 | 3/2005 | Romanik et al. | |
| 2013/0147313 A1 * | 6/2013 | Sachse | 310/300 |

FOREIGN PATENT DOCUMENTS

DE 102004020149 11/2005

OTHER PUBLICATIONS

International Search Report for PCT/EP2012/072268, issued on Jan. 18, 2013.

* cited by examiner

*Primary Examiner* — Reena Aurora
(74) *Attorney, Agent, or Firm* — Kenyon & Kenyon LLP

(57) ABSTRACT

An apparatus for detecting a number of revolutions of a rotatable shaft, is proposed, which apparatus encompasses a magnet disposed on the shaft, and a micromechanical device. A detection element of the micromechanical device, which element interacts with the magnet, is advanced stepwise upon each movement of the magnet past the micromechanical device in accordance with the movement direction of the magnet.

14 Claims, 7 Drawing Sheets

DEVICE AND METHOD FOR DETECTING THE NUMBER OF REVOLUTIONS OF A ROTATABLE SHAFT

FIELD OF THE INVENTION

The present invention relates to an apparatus and a method for detecting a number of revolutions of a rotatable shaft

BACKGROUND INFORMATION

Revolution counters that make available a steering angle datum of a vehicle are known in the existing art, in which context an actual measuring element can measure only up to a maximum of 360°. Measurements up to 360°/n, where n is a natural number, are also known. Half-revolutions of 180° can in particular also be counted, for example in the context of giant magnetoresistance (GMR). The steering angle is thus no longer unequivocal for steering angles above 360° (several revolutions).

Also known are revolution counters that are embodied in noncontact fashion and are functional even at zero current (e.g. when the ignition is switched off or the motor vehicle's battery is disconnected). In this connection, German Published Patent Appln. No. 10 2004 020 149 discloses a sensor element for a revolution counter, which element has a layered structure that uses the GMR effect to read out revolution information. The revolution counter is thereby capable, without an energy supply, of bringing about a change in magnetization in the sensor element when a magnetic field is moved past the sensor element.

In addition, an unequivocal representation of steering angles greater than 360° conventionally requires two gears having integrated magnets, a magnetic field vector being evaluated by a magnetic field sensor element, and the steering angle being calculated via a vernier algorithm.

SUMMARY

The object of the present invention is to make available an improved apparatus for detecting a number of revolutions of a rotatable shaft.

The object is achieved with an apparatus for detecting a number of revolutions of a rotatable shaft, having
  a magnet disposed on the shaft, and
  a micromechanical device, a detection element of the micromechanical device, which element interacts with the magnet, being movable stepwise upon each movement of the magnet past the micromechanical device in accordance with the movement direction of the magnet.

An advantage of the apparatus according to the present invention is that current information regarding the number of revolutions of a rotatable shaft can be made available in noncontact and zero-current fashion by way of a micromechanical device. As a result of the configuration as a micromechanical device, a space-saving and flexibly usable shape of the apparatus according to the present invention can advantageously be made available.

A preferred embodiment of the apparatus provides that a retaining element for retaining the detection element in a detecting position of the micromechanical device is provided. Reliable and unequivocal detection of a rotation speed datum by way of the micromechanical device is thereby facilitated.

An advantageous refinement of the apparatus according to the present invention provides that the detection element is substantially linearly displaceable. This advantageously facilitates reliable detection of different latch positions that are unequivocally distinguishable from one another.

A preferred embodiment of the apparatus according to the present invention provides that latch positions for the detection element are embodied as substantially cuboidal or wedge-shaped depressions. Alternative shapes for latch positions are thereby made available, with the result that different detection principles for the number of revolutions are supported.

An advantageous refinement of the apparatus according to the present invention provides that the detection element is embodied as a substantially U-shaped slider shoe. Thanks to this specific configuration of the detection element, particularly reliable detection of the number of revolutions is provided by way of the two limbs of the slider shoe, due to particularly well-defined latch positions of the slider shoe.

Provision is preferably made that a guidance device for the slider shoe is embodied as a linear involute bar. An advantage of this specific embodiment of the guidance device for the slider shoe is that very low friction losses occur between the guidance device and the slider shoe, thereby facilitating low-friction movement from one latch position into the next.

An advantageous refinement of the apparatus according to the present invention provides that the retaining element is embodied as a pressure bar for the slider shoe. The pressure bar advantageously facilitates retention of the slider shoe in each of the latch positions, and reliable advancing of the slider shoe from one latch position to the respective next one.

According to a preferred embodiment of the apparatus according to the present invention, provision is made that the retaining element has magnetic properties. The result is that a magnetic interaction is generated between the retaining element and the magnet disposed on the shaft, so that advancing of the slider shoe from one latch position into the next can be simplified.

Provision is preferably made that the detection element is embodied as a substantially circular notched structure, the notched structure being rotatable by an amount equal to one notch upon each movement of the magnet past the micromechanical device. This makes available a second, alternative embodiment of the detection element, with the result that alternative evaluation principles for the number of revolutions can be used.

An advantageous embodiment of the apparatus according to the present invention provides that the retaining element is embodied as a resilient pin. The resilient pin favorably facilitates on the one hand retention of the notch structure in each latch position, and on the other hand movement of the notch structure to the respective next latch position.

A preferred embodiment of the apparatus according to the present invention provides that detection of the number of revolutions can be carried out capacitively or resistively. This advantageously makes possible different detection principles for the number of revolutions.

Provision is preferably made that the surface of the detection element exhibits at least partially a low-friction coating and/or an anti-adhesion layer and/or a surface topography. Mechanical friction between the detection element and the guidance element is thereby advantageously minimized, thereby facilitating low-wear movement of the detection element inside the micromechanical device. A service life of the micromechanical device can thereby be maximized.

DETAILED DESCRIPTION

Figure 1A:
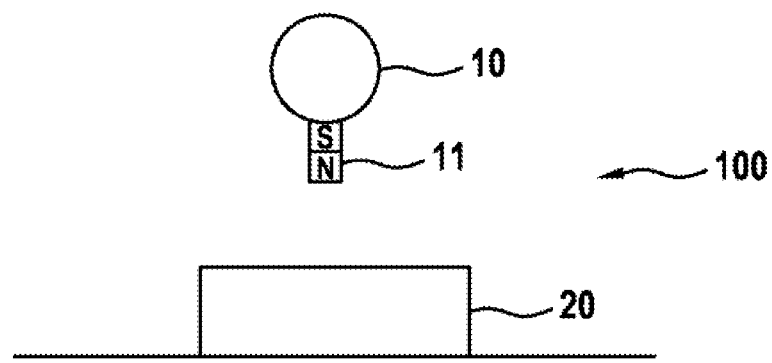
FIG. 1a is an overall schematic depiction of the detection apparatus according to the present invention.

FIG. 1*a* is a schematic overall view of an embodiment of detection apparatus 100 according to the present invention. A rotatable shaft 10 (e.g. a steering shaft of a motor vehicle), the number of revolutions of which are to be detected, has a magnet 11 (e.g. a permanent magnet) disposed on its periphery. After each complete revolution (360-degree rotation) of shaft 10, magnet 11 is moved past a micromechanical device 20 that is disposed sufficiently close to shaft 10. Detection apparatus 100 utilizes an interaction between magnet 11 and a detection element (not depicted in FIG. 1*a*) of micromechanical device 20, detection element 21 having magnetic properties.

Figure 1B:
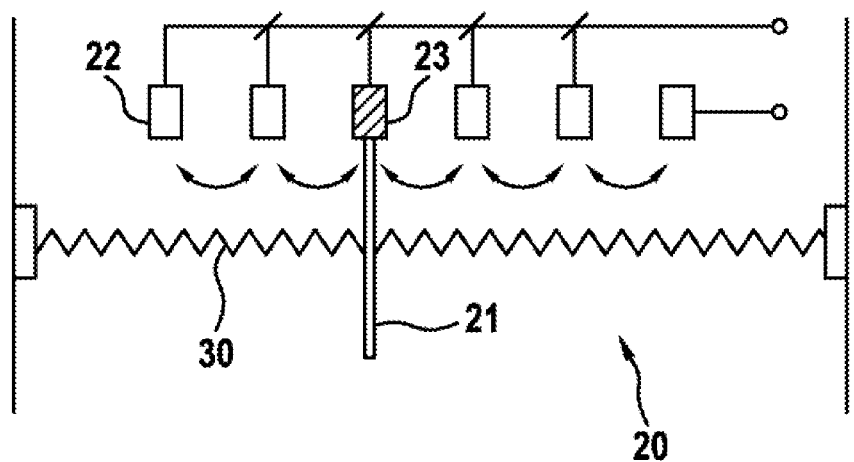
FIG. 1*b* is a schematic plan view depicting the detection apparatus according to the present invention.

FIG. 1*b* is a plan view schematically depicting the function of micromechanical device 20. Detection element 21 has a rod-like structure and is mounted by way of a retaining element 30 resiliently inside micromechanical device 20. Detection element 21 is movable substantially linearly between individual latch positions 22 of micromechanical device 20, and has a ferromagnetic material 23 that can be premagnetized. Each time magnet 11 (not depicted in FIG. 1*b*) sweeps past micromechanical device 20, a magnetic interaction occurs between magnet 11 and detection element 21. As a result of this interaction, detection element 21 inside micromechanical device 20 can be moved stepwise by a respective amount equal to one individual latch position 22 in accordance with the movement direction of magnet 11.

A spring force of retaining element 30 is designed so that the magnetic force of magnet 11 is sufficient to deflect detection element 21 far enough that its tip moves into the next latch position 22 located in the rotation direction of shaft 10. The latch position 22 in which detection element 21 is located is thus an unequivocal characteristic of the number of revolutions of rotatable shaft 10, and thereby encodes the number of revolutions of shaft 10. A total of six latch positions 22 are depicted in FIG. 1*b*, which means that a total of five complete revolutions of rotatable shaft 10 can be detected by way of micromechanical device 20.

Figure 1C:
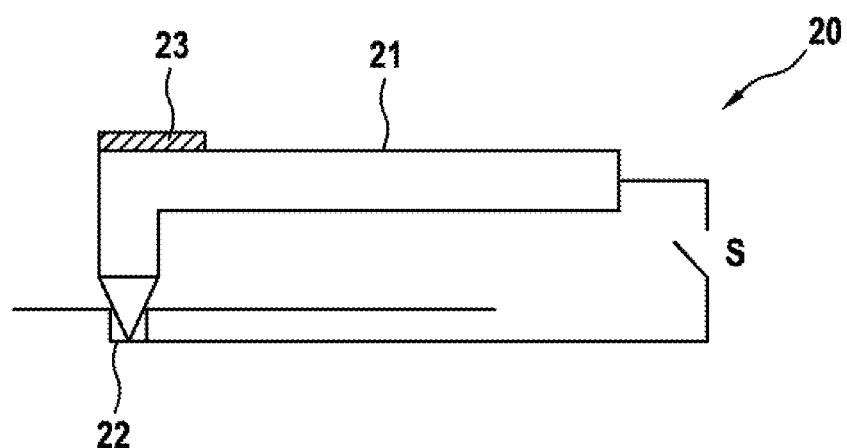
FIG. 1*c* is a schematic cross-sectional view depicting the detection apparatus according to the present invention.

FIG. 1*c* is a further schematic depiction, in a cross-sectional view, of micromechanical device 20. It is evident that detection element 21 is located in a latch position 22, an electrical readout device in the form of an electrical circuit being used in order to evaluate the respective latch position 22. For this purpose, a switch S of the circuit is closed whenever detection element 21 is in latch position 22, electrical resistances of different values being switched in as a function of the latch position 22 (resistive evaluation principle). An unequivocal correlation between latch position 22 and a number of revolutions of rotatable shaft 10 is thereby created.

Figure 1D:
FIG. 1*d* shows various embodiments of latch positions of a detection element of the detection apparatus according to the present invention.

FIG. 1*d* shows three different embodiments of latch positions 22 for detection element 21, in which context the embodiment can also depend on the manufacturing process. Latch positions 22 can be embodied substantially as cuboidal or wedge-shaped or semicylindrical depressions inside micromechanical device 20, with the result that different detection mechanisms can be implemented for detecting the latch position 22 in which detection element 21 is located.

Figure 1E:
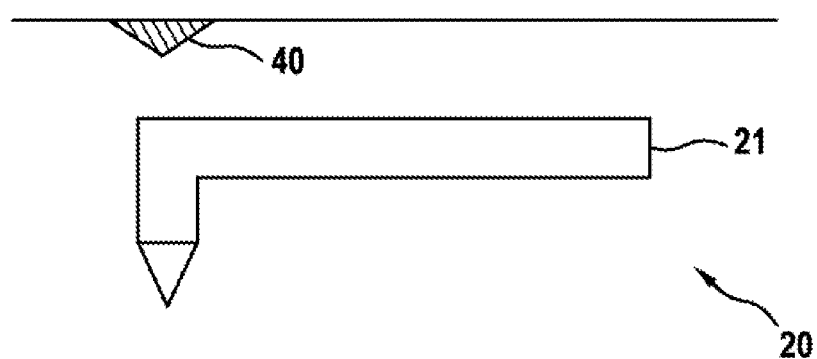
FIG. 1*e* is a further schematic cross-sectional view depicting the detection apparatus according to the present invention.

FIG. 1*e* is a further schematic depiction, in a cross-sectional view, of micromechanical device 20. It is evident that a limiting element 40 is provided so that detection element 21, on its travel between the individual latch positions 22 (not depicted in FIG. 1*e*), cannot deflect upward in uncontrolled fashion ("jump out") and is thus securely guided between the individual latch positions 22. Limiting element 40 can be embodied, for example, as a stop of a capping wafer (not depicted) that closes off the entire micromechanical device 20 at the top.

Figure 1F:
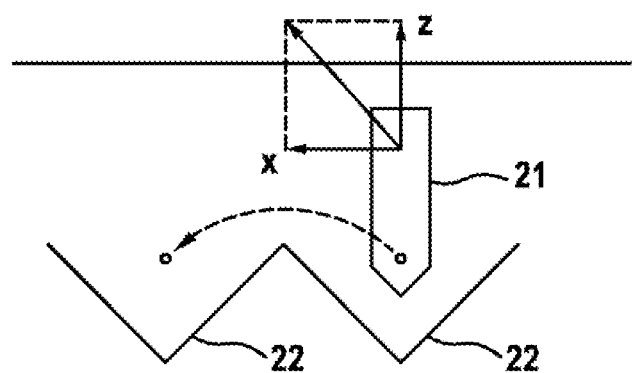
FIG. 1*f* schematically depicts a movement sequence of the detection element of the detection apparatus according to the present invention.

FIG. 1*f* schematically shows a movement sequence of detection element 21 from one latch position 22 into the next latch position 22. It is evident that a magnetic force, which has a force component in the Z direction and a force component in the X direction, acts on detection element 21, and detection element 21 is thereby moved or raised from one latch position 22 into the next latch position 22. It is thus necessary to ensure that the corresponding force component acts on detection element 21 as magnet 11 sweeps past micromechanical device 20. The movement sequence is indicated by way of a dashed arrow.

Figure 2:
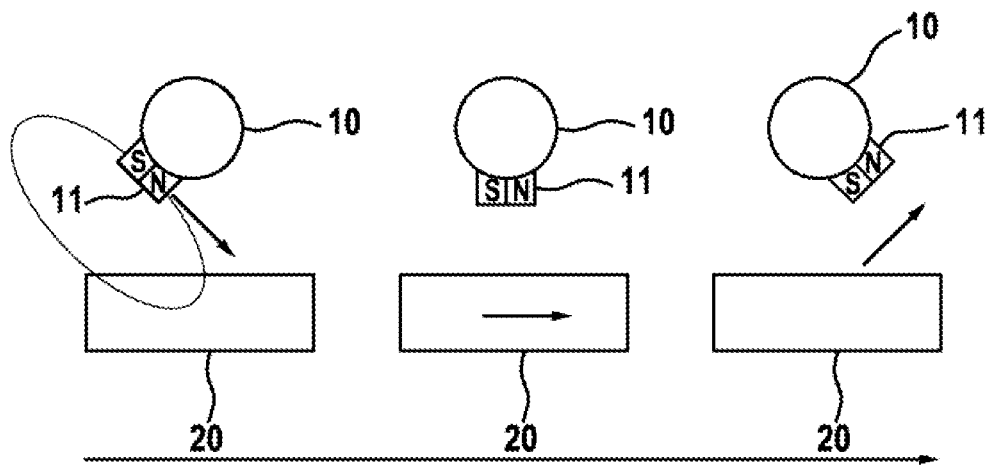
FIG. 2 schematically depicts a magnetic force that is utilized by the apparatus according to the present invention.

FIG. 2 shows, with reference to a schematic depiction, an effect of a magnetic force vector of magnet 11 on micromechanical device 20. In the lower portion of FIG. 2 a corresponding movement direction of detection element 21 (not depicted in FIG. 2) is indicated by way of an arrow, the arrow direction corresponding to a movement direction of magnet 11 past micromechanical device 20. It is evident from FIG. 2 that closed field lines between the north and south pole of magnet 11 produce a force on micromechanical device 20. In the depiction on the left in FIG. 2 the force vector is directed toward the bottom right, and in the course of the movement of magnet 11 past micromechanical device 20 it changes its direction to a horizontal direction (center image in FIG. 2) and to a direction oriented to the top right (right image in FIG. 2).

As a result thereof, the force of the magnetic field of magnet 11 acts on micromechanical device 20 in such a way that detection element 21 of micromechanical device 20 moves from left to right. Analogously, upon a rotation of magnet 11 in the other direction (clockwise rotation of shaft 10), detection element 21 of micromechanical device 20 will move to the left. A movement direction of magnet 11 of rotatable shaft 10 is thus always associated with the movement direction of detection element 21 of micromechanical device 20, ensuring unequivocal detection of the number of revolutions of rotatable shaft 10.

Figure 3:
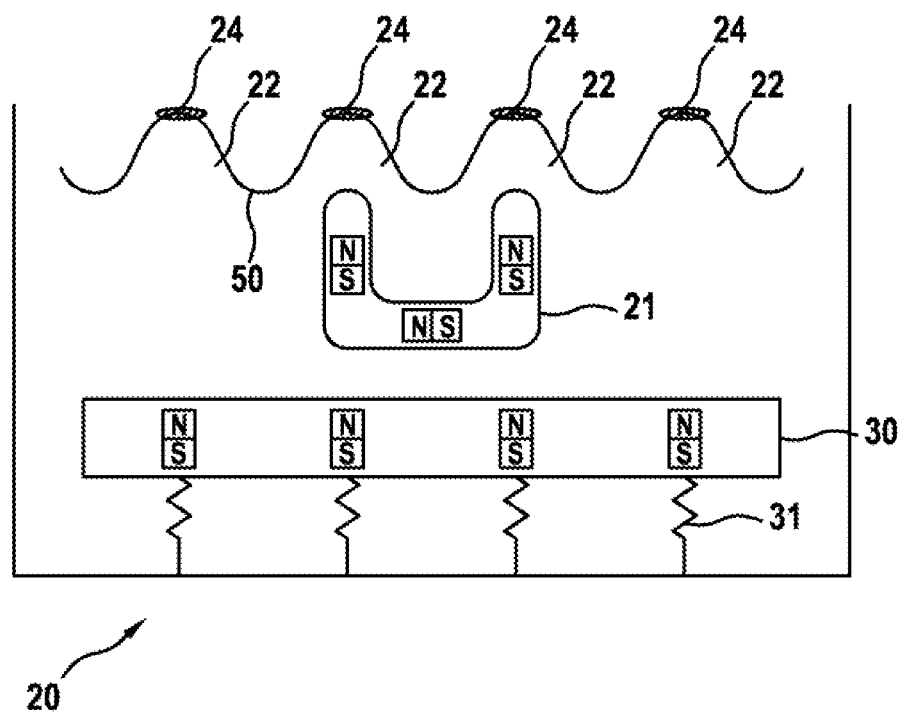
FIG. 3 schematically depicts a detection element embodied as a U-shaped slider shoe.

FIG. 3 shows an embodiment of micromechanical device 20 at a higher level of detail, detection element 21 being embodied as a substantially U-shaped slider shoe. On its path between the individual latch positions 22, which preferably have contact surfaces 24, detection element 21 is guided by a stationary guidance device 50 that is preferably embodied as a linear involute bar. The respective position of detection element 21, and thus the number of revolutions of shaft 10, can be encoded by way of contact surfaces 24. As a result of its conformation, guidance device 50 embodied in this fashion helps ensure that detection element 21 experiences as little friction as possible on its travel between the individual latch positions 22, and can be shifted between the individual latch positions 22 with minimal energy expenditure. In addition, as assistance toward that end, a friction-reducing anti-adhesion or low-friction coating ("anti-stiction" coating) can also be applied at least partially on detection element 21 and/or on guidance device 50. Alternatively or additionally, a surface topography (e.g. in the form of nubs) can also be applied on detection element 21 and/or on guidance device 50. This avoids or reduces particle formation and adhesion or sticking of the structures.

Retaining element 30, which is preferably embodied as a pressure bar or compression bar supported by springs 31, is used in order to push detection element 21 against guidance device 50 and thereby facilitate a defined movement of detection element 21 between latch positions 22. Retaining element 30 also preferably has magnetic properties that permit retaining element 30 to interact with magnet 11 (not depicted in FIG. 3) in such a way that a coordinated interaction between magnet 11 and detection element 21 is facilitated.

This is because on the one hand the pressure bar serves to retain detection element 21 securely in the individual latch positions 22, thereby advantageously preventing detection element 21 from jumping in uncoordinated fashion out of the respective latch position 22 in the context of vibrations of micromechanical device 20. On the other hand, retaining element 30 contributes to an orderly transition of detection element 21 between the individual latch positions 22 by exerting on detection element 21, by way of springs 31, a defined force that depends not only on the spring constants of springs 31 but also on the magnetic properties of retaining element 30.

FIGS. 4*a* to 4*d* schematically depict one complete movement sequence of detection element 21 between two different latch position pairs. Force relationships are indicated in the aforesaid Figures by thin arrows (force of magnet 11) and by outline arrows (force on detection element 21). It is evident from FIG. 4*a* that a force of magnet 11 acts substantially vertically from above on detection element 21, with the result that detection element 21 is pushed downward out of a first latch position pair 22*a*, 22*b*.

In the next phase (FIG. 4*b*) the direction of the force vector of magnet 11 changes to one obliquely to the bottom right, so that a corresponding force is exerted on detection element 21. As a result thereof, detection element 21 is raised out of first latch position pair 22*a*, 22*b*, while retaining element 30 prevents detection element 21 from tilting. In a subsequent phase (FIG. 4*c*) the force direction of magnet 11 is directed substantially horizontally to the right, so that a force substantially horizontally to the right is exerted on detection element 21. The result is that the slider shoe moves along in the X direction over the crest of the "comb" of guidance device 50.

In the last step of the movement sequence (FIG. 4*d*), the next latch position pair 22*b*, 22*c* is reached, this being facilitated by a force of magnet 11 acting on detection element 21 in the Y direction. Retaining element 30 is correspondingly pulled upward, with the result that secure seating of detection element 21 in latch position pair 22*b*, 22*c* is achieved.

Figure 4A:
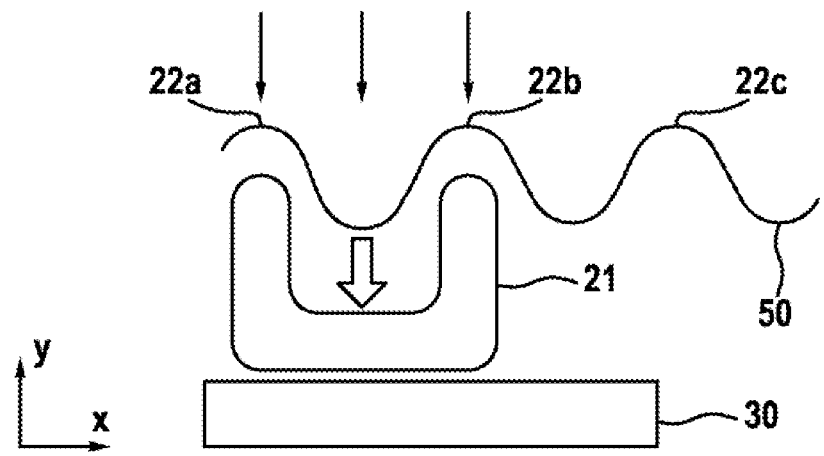
FIGS. 4*a*-4*d* show several phases of a movement sequence of a detection element embodied as a U-shaped slider shoe.
Figure 4B:
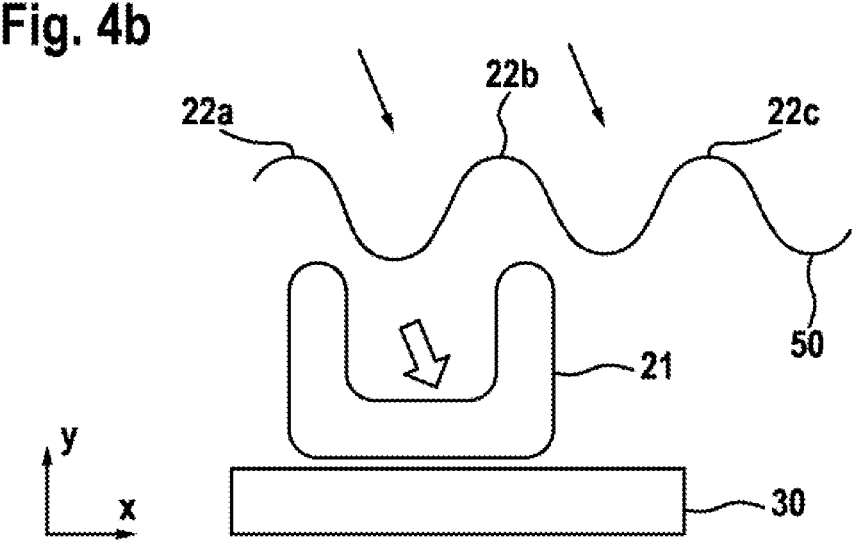
Figure 4C:
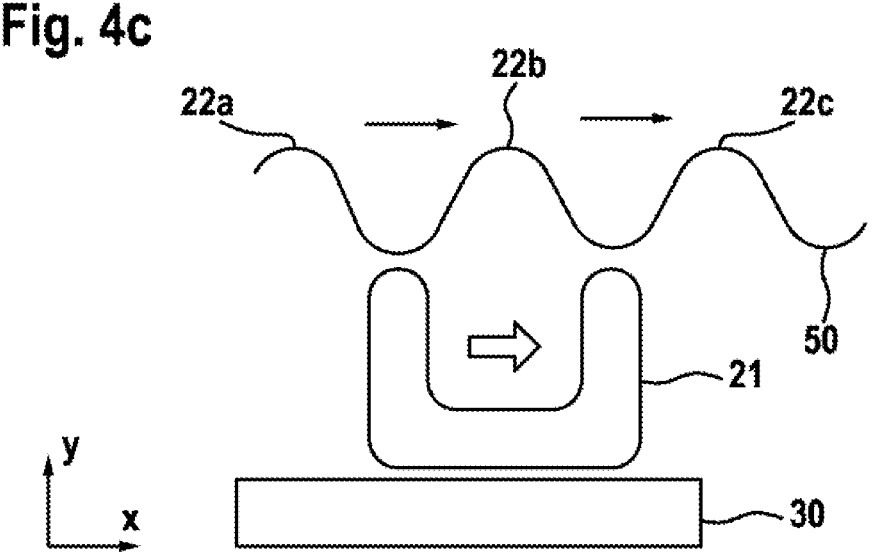
Figure 4D:
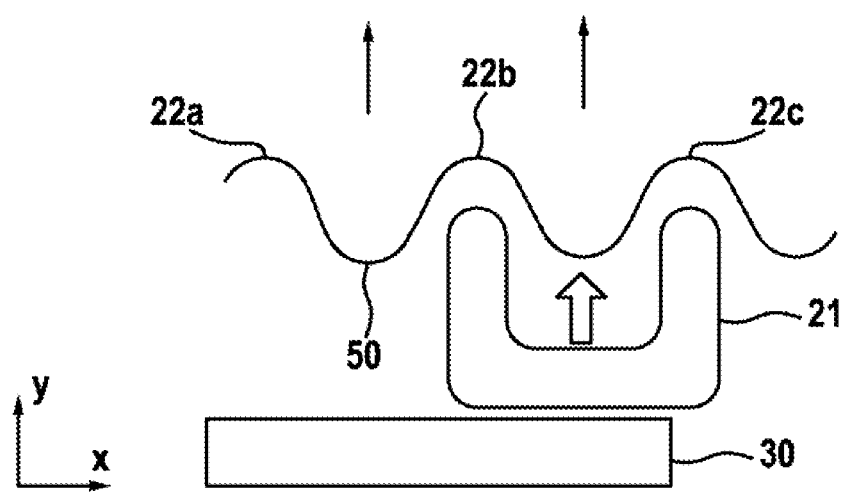

As a result of the magnetic interaction between magnet 11 and retaining element 30, retaining element 30 is also pushed downward especially in the phases shown in FIG. 4*b* and FIG. 4*c*, thereby facilitating the movement of detection element 21 into the next latch position pair 22*b*, 22*c*, ultimately facilitating a guided movement of detection element 21 between the latch position pairs.

What results all in all is a kind of assisted "sliding" or "slipping" movement of detection element 21 on guidance device 50 from one latch position pair 22*a*, 22*b* into the next latch position pair 22*b*, 22*c*, a low-friction movement of detection element 21 along the surface of guidance device 50 being facilitated by the embodiment of guidance device 50 as an involute bar.

Figure 5:
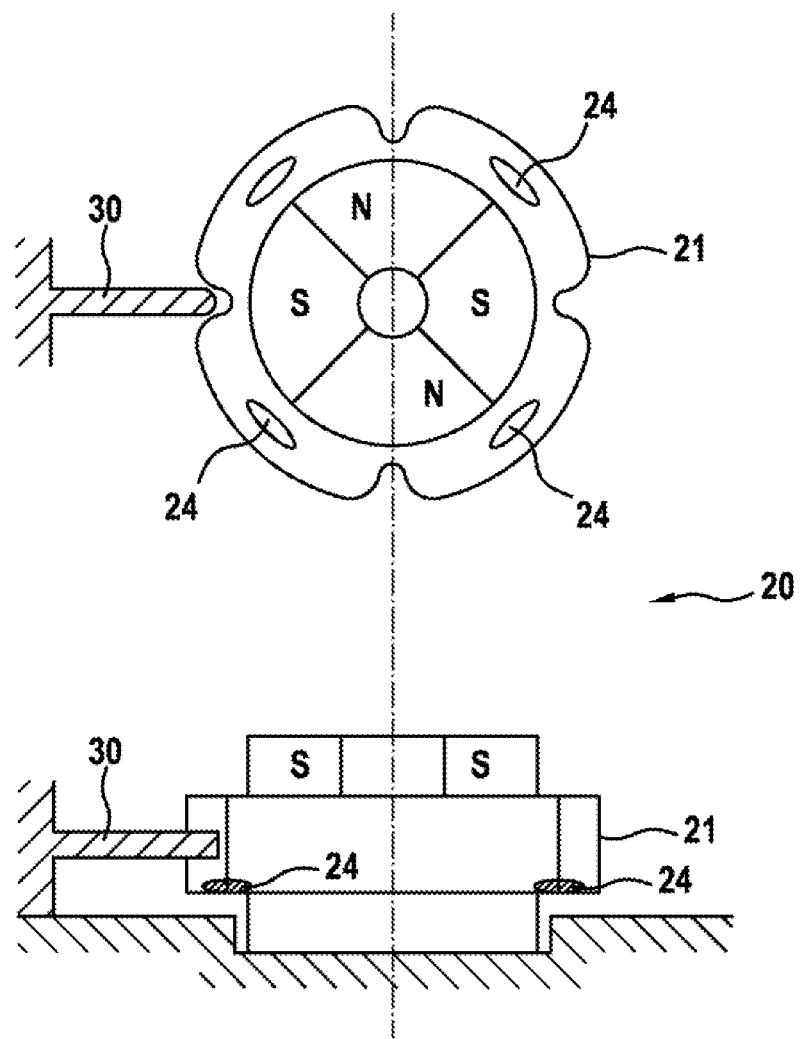
FIG. 5 shows a further embodiment of the detection apparatus according to the present invention having a detection element embodied as a circular notched structure.

FIG. 5 shows a further embodiment of micromechanical device 20 in a plan view and a cross-sectional view, detection element 21 now being embodied as a substantially circular notched structure (e.g. a gear) that is mounted rotatably. It is evident that detection element 21 has four notches; more notches can of course also be provided. An embodiment of retaining element 30 is disposed in a side region of micromechanical device 20. Retaining element 30 is embodied here as a kind of spring pin that on the one hand retains detection element 21 in such a way that retaining element 30 engages into one of the notches and thus retains detection element 21 in a latch position. On the other hand, the resilient properties of retaining element 30 assist detection element 21 in rotating toward the next notch. A capacitive or resistive detection of the position of detection element 21, and thus of the associated number of revolutions, can be carried out by way of contact surfaces 24 that are disposed on an underside of detection element 21. The magnetic properties of detection element 21 are indicated by magnetic poles (N/S); several of the aforesaid magnetic poles can of course also be provided for detection element 21, resulting in a corresponding increase in the number of notches.

The magnetic interaction of magnet 11 with detection element 21 embodied as a circular notched structure occurs analogously to the embodiments explained above. Each time magnet 11 has performed one complete revolution, retaining element 30 latches into a subsequent notch of detection element 21. The rotation direction of detection element 21 is associated with the movement direction of magnet 11 past detection device 20.

In summary, the invention makes available a refinement of existing steering angle sensors (SAS) or combined torque and steering angle sensors (TAS). What is proposed is a noncontact steering angle sensor having a measurement range of 360° or 180° and having an additional revolution counter, such that the apparatus recognizes, even without being supplied with power, how many revolutions of a steering shaft have taken place. It is thereby possible, for example, advantageously to improve a control unit of the motor vehicle, to apply control to a cornering light of the motor vehicle, or to improve control of a steering wheel power steering system.

The basis of the invention is a micromechanical structure, preferably embodied in silicon, having a movable detection element that has magnetic properties. Alternatively, however, the structure can also be made from other materials, for example from plastics and metals.

It is self-evident to one skilled in the art that the features of the invention that have been described can be suitably modified and combined with one another without deviating from the essence of the invention.

What is claimed is:

1. An apparatus for detecting a number of revolutions of a rotatable shaft, comprising:
   a magnet disposed on the shaft; and
   a micromechanical device including a detection element that magnetically interacts with the magnet and is movable stepwise by the magnetic interaction upon each movement of the magnet past the micromechanical device in accordance with a movement direction of the magnet.

2. The apparatus as recited in claim 1, further comprising a retaining element for retaining the detection element in a detecting position of the micromechanical device.

3. The apparatus as recited in claim 1, wherein the detection element is substantially linearly displaceable.

4. The apparatus as recited in claim 1, wherein latch positions for the detection element are embodied as substantially one of cuboidal and wedge-shaped depressions.

5. The apparatus as recited in claim 1, wherein the detection element includes a substantially U-shaped slider shoe.

6. The apparatus as recited in claim 5, further comprising a guidance device for the slider shoe, the guidance device including a linear involute bar.

7. The apparatus as recited in claim 5, further comprising a retaining element for retaining the detection element in a detecting position of the micromechanical device, wherein the retaining element includes a pressure bar for the slider shoe.

8. The apparatus as recited in claim 7, wherein the retaining element includes a resilient pin.

9. The apparatus as recited in claim 5, wherein the retaining element includes a magnetic property.

10. The apparatus as recited in claim 1, wherein the detection element includes a substantially circular notched structure, the notched structure being rotatable by an amount equal to one notch upon each movement of the magnet past the micromechanical device.

11. The apparatus as recited in claim 1, wherein a detection of a number of revolutions is carried out one of capacitively and resistively.

12. The apparatus as recited in claim 1, wherein a surface of the detection element exhibits at least partially at least one of a low-friction coating, an anti-adhesion layer, and a surface topography.

13. A method for detecting a number of revolutions of a rotatable shaft by way of a detection apparatus, comprising:

moving a magnet, disposed on the shaft, past a micromechanical device so that the magnet magnetically interacts, upon each movement of the magnet past the device, with a detection element of the micromechanical device in such a way that the detection element is moved stepwise by the magnetic interaction in accordance with a movement direction of the magnet.

14. A method of using an apparatus as a revolution counter for a steering angle datum of a motor vehicle, the apparatus being for detecting a number of revolutions of a rotatable shaft, and comprising:

a magnet disposed on the shaft; and a micromechanical device including a detection element that magnetically interacts with the magnet and is movable stepwise by the magnetic interaction upon each movement of the magnet past the micromechanical device in accordance with a movement direction of the magnet.

* * * * *